United States Patent Office 3,836,552
Patented Sept. 17, 1974

3,836,552
DERIVATIVES OF PERFLUORATED CARBOXYLIC ACIDS
Hans Stach, Suzano Sao Paulo, Brazil, and Dieter Hoffmann, Burghausen, Salzach, and Heinz Brecht, Burg, Germany, assignors to Farbwerke Hoechst Aktiengesellschaft, Frankfurt am Main, Germany
Filed May 31, 1972, Ser. No. 258,365
Claims priority, application Germany, June 2, 1971,
P 21 27 232.2
Int. Cl. C07c *103/30*
U.S. Cl. 260—404.5     4 Claims

ABSTRACT OF THE DISCLOSURE

Surface-active perfluorated alkane-carboxylic acid-amide-amine derivatives and their quaternization products of the formulae

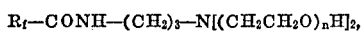

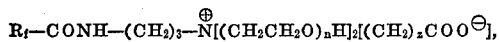

in which $n$ is a number from 1 to 4, $z$ is 1 or 2, R represents a lower alkyl group and $X^-$ is a halogen, sulfate or methosulfate anion, and process for preparing these compounds, wherein perfluoro-alkane-carboxylic acid alkyl esters are reacted with 1-(N,N-diethanol)-3-amino-propane and, depending on the compound, subsequently oxethylated, esterified and/or quaternized. The new compounds strongly reduce the surface tension of aqueous solutions. They have an excellent wetting power and may also be used as emulsifiers for fluoro-hydrocarbon/water emulsions.

The present invention provides surface-active perflurated carboxylic acid-amidamine derivatives and their quaternization products of the general formula $$R_fCONH(CH_2)_3Y$$

in which $R_f$ represents an unbranched perfluoro-alkyl group of 6 to 10 carbon atoms and Y represents a group of the formula

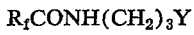

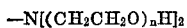

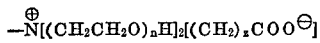

in which $n=1-4$, $z=1-2$, R represents lower alkyl and $X^-$ represents halogen, sulfate or methosulfate, and a process for preparing them.

German Patents 1,006,427 and 1,006,426 describe processes for the manufacture of surface-active carboxylic acid-amidamine derivatives which correspond to the general formulae

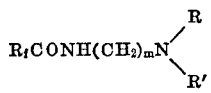

and

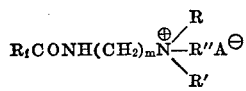

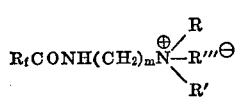

in which $R_f$ represents a perfluoro-alkyl group having 3–11 carbon atoms, $m$ represents a whole number of 2 to 6, R, R' and R" represent alkyl groups having 1 to 6 carbon atoms and R''' represents a carboxy- or dicarboxy-alkylene group and $A^-$ represents an anion.

In the technical use of fluoro-tensides it is desirable to apply them in as low quantities as possible, i.e. they should have a strong action already when applied in low concentrations. The not-quaternized compounds described above have the disadvantage of being too sparingly soluble in water to produce a strong reduction of the surface tension. The quaternized compounds described above have a good solubility, but in order to produce a strong reduction of the surface tension they must be applied in relatively high concentrations.

The compounds prepared according to the present invention largely avoid these disadvantages, because the introduction of the alkylol groups, and still more their subsequent oxethylation, increases the water-solubility of the not-quaternized compounds, without affecting the solubility in organic solvents, to such an extent that a strong reduction of the surface tension is obtained when they are used in water. The surface activity of the aqueous solutions of the quaternized compounds of the invention is also considerably higher than that of the corresponding afore-described alkyl compounds. This was clearly proved by the series

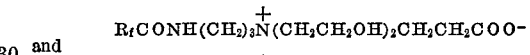

and

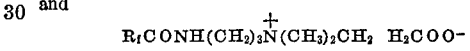

Figure 1:
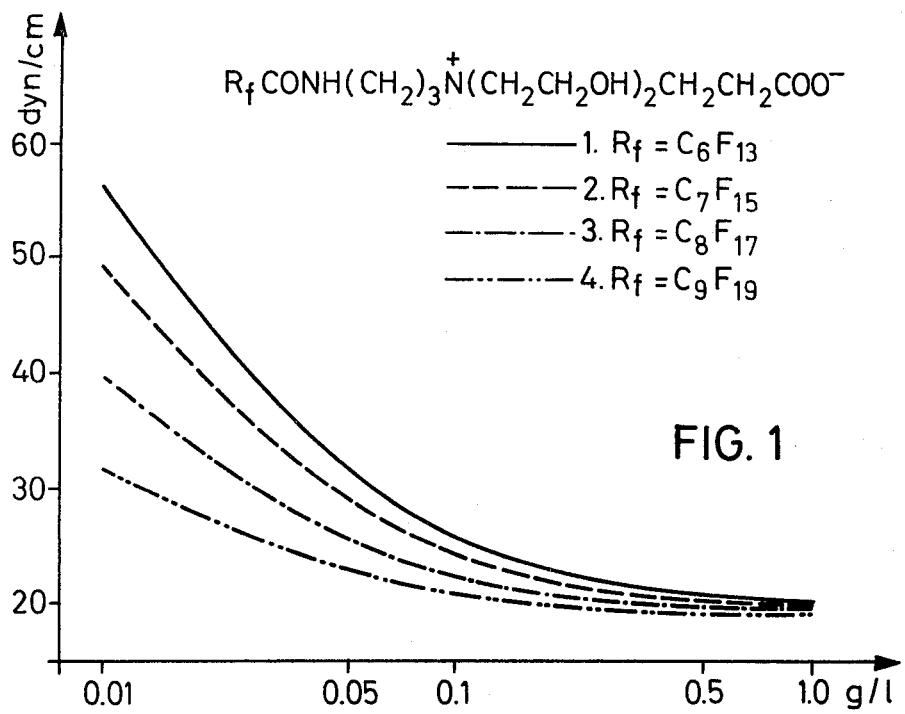
Figure 2:
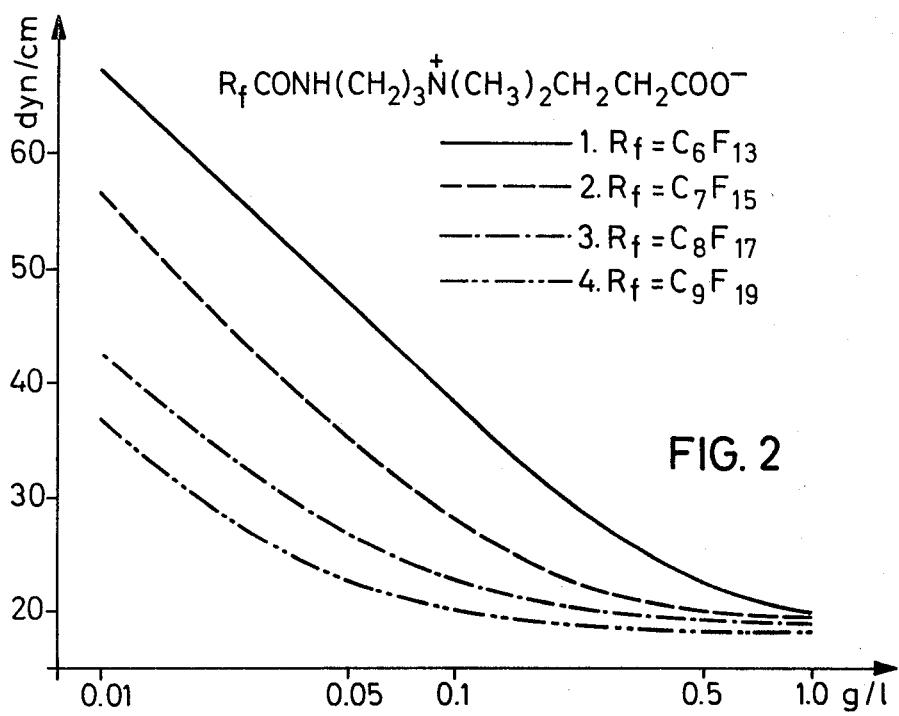

(in which $R_f=C_6F_{13}^-$, $C_7F_{15}^-$, $C_8F_{17}^-$ and $C_9F_{19}^-$) (cf. Table 1 and FIG. 1 and FIG. 2, which show function curves of the surface tension (dyn./cm.) of aqueous solutions in dependence of the concentration (in grams of substance per liter of solution)).

Thus, with the quaternized alkylol-groups containing compounds essentially smaller quantities are required for obtaining the same reductions of the surface tension (up to 80%) as with analogous alkyl-groups containing substances.

The compounds of the invention are prepared as follows: the reaction of perfluoro-carboxylic acid alkyl esters with N,N-diethylol-trimethylenediamine yields perfluoro-carboxylic acid amido-trimethylene-dialkylolamines of the formula

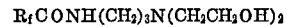

These reaction products have differently reactive centers, namely the OH-groups and the amine nitrogen. The alkylol groups may be, for example etherified or esterified, the amine nitrogen may be quaternized. Suitable etherification agents are ethylene- or propylene oxide, suitable esterification components are acrylic acid, methacrylic acid, sulfuric acid, suitable quaternizing agents are alkyl halides, dimethyl sulfate, chloroacetic acid, lactones and sultones.

The perfluoro-alkyl carboxylic acid amido-trimethylene-diethylolamines, their oxalkylates and their quaternization products are suitable for strongly reducing the surface tension in aqueous systems already when applied in low concentrations.

Aqueous solutions have an excellent wetting power, especially at elevated temperature. This was proved on textile material according to the DIN test 53,901 (German Industrial Standard) for the determination of the immersion wetting power (cf. Table 2). At the same time, the superior wetting power of the aqueous solutions of the dialkylol compounds of the invention as compared to that of analogous dialkyl compounds is remarkable.

The compounds of the invention may also be used as emulsifiers. There may be prepared with them, for example fluoro-hydrocarbon/water emulsions which have industrial importance in the field of cleaning of textile materials, metallic and non-metallic industrial materials.

The following Examples illustrate the invention:

EXAMPLE 1

100 g. of perfluoro-octanoic acid ethyl ester were dissolved in 100 ml. of ether and rinsed with an inert gas. 33 g. of trimethylene-diamine-N,N-diethanol were added dropwise, while stirring, at 0–5° C., within 4 hours. The whole was then stirred for 3 hours at room temperature. Ether and alcohol were then removed on a rotary evaporator at a bath temperature of 70° C. A colorless oil remained. The yield was 123 g. (=100%) of product having a purity of 98.5% (gas chromatogram).

$C_7F_{15}CONH(CH_2)_3 N(CH_2CH_2OH)_2$.—Calc. percent total base-N: 2.51; sec.+tert. N: 2.51; percent tert. N: 2.51. Found: total base-N: 2.52; sec.+tert. N: 2.43; percent tert. N: 2.43.

In a second experiment carried out in a manner analogous to that of the above-described preparation, 800 g. of perfluoro-octanoic acid ethyl ester were dissolved in 500 ml. of ether and reacted with 293 g. of trimethylene-diamine-N,N-diethanol. When the reaction was completed, the solvent was not removed, but 132 g. of propiolactone were added dropwise, while stirring, at room temperature. The whole was then boiled for 6 hours under reflux. Ether and alcohol were then removed at 60° C. on a rotary evaporator. 1100 g. (96.2% of the theory) of a colorless oil remained.

Calc: percent C, 34.3; percent F, 45.1; percent H, 3.4; percent N, 4.4. Found: percent C, 34.6; percent F, 43.9; percent H, 3.5; percent N, 4.3.

EXAMPLE 2

50 g. and 90 g., respectively, of perfluoro-octanoic acid-amido-trimethylene-N,N-diethanolamine were introduced together with 0.1 g. and 0.3 g., respectively, of sodium methylate into an autoclave provided with a stirring device and heated to 100° C. At this temperature, 13 g. and 47 g., respectively, of ethylene oxide were introduced under pressure at this temperature in the course of 5 hours. A viscous liquid formed, 30 g. and 27 g., respectively, of the above oxethylates were placed in a stirring flask and 3 g. and 2.3 g., respectively, of propiolactone were added dropwise within 15 minutes. During that time the temperature rose by some degrees. The whole was stirred for 2 hours, whereafter 27 g. and 24 g., respectively, of viscous oils were obtained, the ethylene oxide contents of which (according to Obruba) were found to be 2.0 and 7.2 mols, respectively.

EXAMPLE 3

20 g. of $C_6F_{13}COOEt$, $C_8F_{17}COOEt$, $C_9F_{19}COOEt$ and $C_{10}F_{21}COOEt$, respectively, were diluted with each time 150 ml. of ether and 12.4 g., 11.0 g., 9.0 g. and 5.8 g., respectively, of trimethylene-diamine-N,N-diethanol were added dropwise, while stirring, in the course of 30 minutes, to these dilutions. The batches were stirred for 3 hours at 25° C. Then, 5.5 g., 4.4 g., 4.0 g. and 2.5 g., respectively, of propiolactone were added dropwise at the same temperature. The batches were boiled for 3 hours under reflux. Ether and ethanol were removed on a rotary evaporator while slowly heating to 50° C. Viscous colorless oils were obtained in almost quantitative yields.

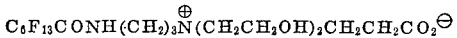

Calc: percent C, 35.2; percent F, 42.6; percent H, 3.6; percent N, 4.8. Found: percent C, 35.3; percent F, 42.7; percent H, 3.8; percent N, 4.7.

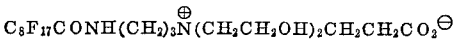

Calc: percent C, 33.5; percent F, 47.5; percent H, 3.1; percent N, 4.1. Found: percent C, 33.5; percent F, 45.6; percent H, 3.6; percent N, 4.5.

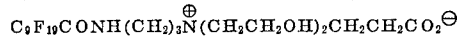

Calc: percent C, 32.9; percent F, 49.4; percent H, 2.9; percent N, 3.8. Found: percent C, 32.7; percent F, 47.9; percent H, 2.9; percent N, 3.9.

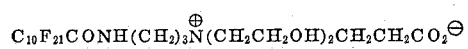

Calc: percent C, 32.3; percent F, 51.2; percent H, 2.7; percent N, 3.6. Found: percent C, 31.3; percent F, 47.3; percent H, 3.0; percent N, 4.4.

EXAMPLE 4

150 g. of

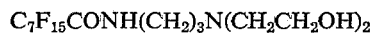

dissolved in 150 ml. of methylene chloride were introduced into a glass autoclave. Methyl chloride was introduced under pressure, while stirring, until a pressure of 3 atmospheres gauge was maintained. The whole was stirred for 2 hours, the pressure was released and the excess of methyl chloride and methylene chloride was removed on a rotary evaporator. 159 g. (97.2% of the theory) of colorless oil remained.

$[C_7F_{15}CONH(CH_2)_3N(CH_2CH_2OH)_2CH_3]Cl$. — Calc: percent C, 31.6; percent F, 46.6; percent H, 3.3; percent N, 4.6. Found: percent C, 32.4; percent F, 37.9; percent H, 3.5; percent N, 5.5.

EXAMPLE 5

Small circular pieces of a cotton fabric were prepared in accordance with DIN 53,901 (German Industrial Standard) and the sinking times in aqueous tenside solutions at different concentration and temperatures were determined according to the indicated standard test process. The corresponding concentrations for a sinking time of 100 seconds were determined graphically. The results are shown in Table 2.

EXAMPLE 6

The quaternization products were found to be suitable for preparing water-in-fluorohydrocarbon emulsions.

The attempt was made to prepare a stable emulsion of 5% of water in trifluoro-trichloro-ethane. Two emulsifiers used in the art for such a purpose were tested in the following quantities:

| Percent of emulsifier I [1] | Percent of emulsifier II [2] | |
|---|---|---|
| 3.0 | 2.0 | Stable solubilized emulsion. |
| 1.5 | 1.0 | No emulsion. |

[1] On the basis of nonylphenol-polyglycol ether (having about 4 mols of ethylene oxide per mol of phenol).
[2] Aqueous/butanolic solution of (mainly) benzene-sulfonic acid (alkali metal salt).

Upon addition of 0.1% of the compound

a stable solubilized emulsion was also obtained with half of the quantities of emulsifier I and II, which was not possible by addition of

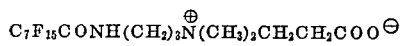

TABLE 1.—SURFACE TENSION IN AQUEOUS SOLUTIONS

| Compound | Surface tension, dyn./cm. | | |
|---|---|---|---|
| | 0.01 g./l. | 0.1 g./l. | 1 g./l. |
| $C_7F_{15}CONH(CH_2)_3N(CH_2CH_2OH)_2$ (Example 1) | 49 | 21 | 18 |
| $C_7F_{15}CONH(CH_2)_3N(CH_2CH_2OH)_2 + 2,0\ EO$ (Example 2) | 53 | 25 | 19 |
| $C_7F_{15}CONH(CH_2)_3N(CH_2CH_2OH)_2 + 7,2\ EO$ (Example 2) | 64 | 41 | 22 |
| $C_7F_{15}CONH(CH_2)_3\overset{+}{N}(CH_2CH_2OH)_2Cl^-$ (Example 4)<br>                        $\vert$<br>                       $CH_3$ | 46 | 22 | 19 |
| $C_7F_{15}CONH(CH_2)_3\overset{+}{N}[(CH_2CH_2O)_{2,0}H]_2CH_2CH_2COO^-$ (Example 2) | 52 | 23 | 22 |
| $C_7F_{15}CONH(CH_2)_3\overset{+}{N}[(CH_2CH_2O)_{4,6}H]_2CH_2CH_2COO^-$ (Example 2) | 53 | 24 | 20 |
| $C_6F_{13}CONH(CH_2)_3\overset{+}{N}(CH_2CH_2OH)_2CH_2CH_2COO^-$ (Example 3) | 55 | 25 | 20 |
| $C_7F_{15}CONH(CH_2)_3\overset{+}{N}(CH_2CH_2OH)_2CH_2CH_2COO^-$ (Example 1) | 48 | 24 | 19.5 |
| $C_8F_{17}CONH(CH_2)_3\overset{+}{N}(CH_2CH_2OH)_2CH_2CH_2COO^-$ (Example 3) | 39 | 22 | 19.0 |
| $C_9F_{19}CONH(CH_2)_3\overset{+}{N}(CH_2CH_2OH)_2CH_2CH_2COO^-$ (Example 3) | 32 | 20.5 | 18.5 |
| $C_6F_{13}CONH(CH_2)_3\overset{+}{N}(CH_3)_2CH_2CH_2COO^-$ | 67 | 37.5 | 20 |
| $C_7F_{15}CONH(CH_2)_3\overset{+}{N}(CH_3)_2CH_2CH_2COO^-$ | 55 | 28 | 19.5 |
| $C_8F_{17}CONH(CH_2)_3\overset{+}{N}(CH_3)_2CH_2CH_2COO^-$ | 43 | 23 | 19.0 |
| $C_9F_{19}CONH(CH_2)_3\overset{+}{N}(CH_3)_2CH_2CH_2COO^-$ | 36 | 20.5 | 18.5 |

TABLE 2.—IMMERSION WETTING POWER OF COTTON ACCORDING TO DIN 53,901

| | Sinking time [25° C. 1 g./l], sec. | Sinking time [g./l.] for 100 sec. at- | | |
|---|---|---|---|---|
| | | 25° C. | 50° C. | 70° C. |
| $C_6F_{13}CONH(CH_2)_3\overset{+}{N}(CH_3)_2CH_2CH_2COO^-$ | 140 | 1.3 | 0.9 | 0.3 |
| $C_6F_{13}CONH(CH_2)_3\overset{+}{N}(CH_2CH_2OH)_2CH_2CH_2COO^-$ | 45 | 0.8 | 0.4 | 0.25 |
| $C_7F_{15}CONH(CH_2)_3\overset{+}{N}(CH_3)_2CH_2CH_2COO^-$ | 135 | 1.2 | 0.6 | 0.16 |
| $C_7F_{15}CONH(CH_2)_3\overset{+}{N}(CH_2CH_2OH)_2CH_2CH_2COO^-$ | 85 | 1.0 | 0.4 | 0.10 |
| $C_8F_{17}CONH(CH_2)_3\overset{+}{N}(CH_3)_2CH_2CH_2COO^-$ | 140 | >2 | 1.2 | 0.6 |
| $C_8F_{17}CONH(CH_2)_3\overset{+}{N}(CH_2CH_2OH)_2CH_2CH_2COO^-$ | 190 | 1.9 | 1.0 | 0.3 |
| $C_9F_{19}CONH(CH_2)_3\overset{+}{N}(CH_3)_2CH_2CH_2COO^-$ | >300 | >2 | >2 | 0.7 |
| $C_9F_{19}CONH(CH_2)_3\overset{+}{N}(CH_2CH_2OH)_2CH_2CH_2COO^-$ | 220 | >2.0 | 1.1 | 0.4 |
| $\left[C_7F_{15}CONH(CH_2)_3\overset{+}{\underset{\underset{CH_3}{\vert}}{N}}(CH_2CH_2OH)_2\right]Cl^-$ | 93 | | | |

We claim:

1. Surface-active perfluorated carboxylic acid-amidamine derivatives and their quaternization products of the general formula $$R_f—CONH—(CH_2)_3—Y$$

in which $R_f$ represents an unbranched perfluoro-alkyl group of 6 to 10 carbon atoms and Y represents a group of the following constitution $$—N[(CH_2CH_2O)_nH]_2$$

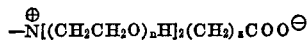

in which $n$ is a number from 1 to 4, $z$ is 1 or 2, R represents a lower alkyl group and $X^\ominus$ represents a halogen, sulfate or methosulfate anion.

2. A compound of the general formula

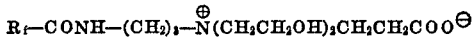

in which $R_f$ has the meaning given in claim 1.

3. A compound of the general formula

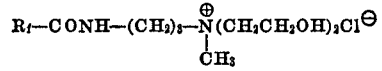

in which $R_f$ has the meaning given in claim 1.

4. A compound of the formula $$C_7F_{15}CONH(CH_2)_3N(CH_2CH_2OH)_2$$

References Cited
UNITED STATES PATENTS

| | | | |
|---|---|---|---|
| 2,764,602 | 9/1956 | Ahlbrecht | 260—404.5 |
| 3,577,447 | 5/1971 | Sweeney et al. | 260—404.5 |
| 3,600,415 | 8/1971 | Sweeney et al. | 260—404.5 |

LEWIS GOTTS, Primary Examiner

E. G. LOVE, Assistant Examiner

U.S.Cl. X.R.

252—357; 260—561 HL, 501.13